Patented July 5, 1949

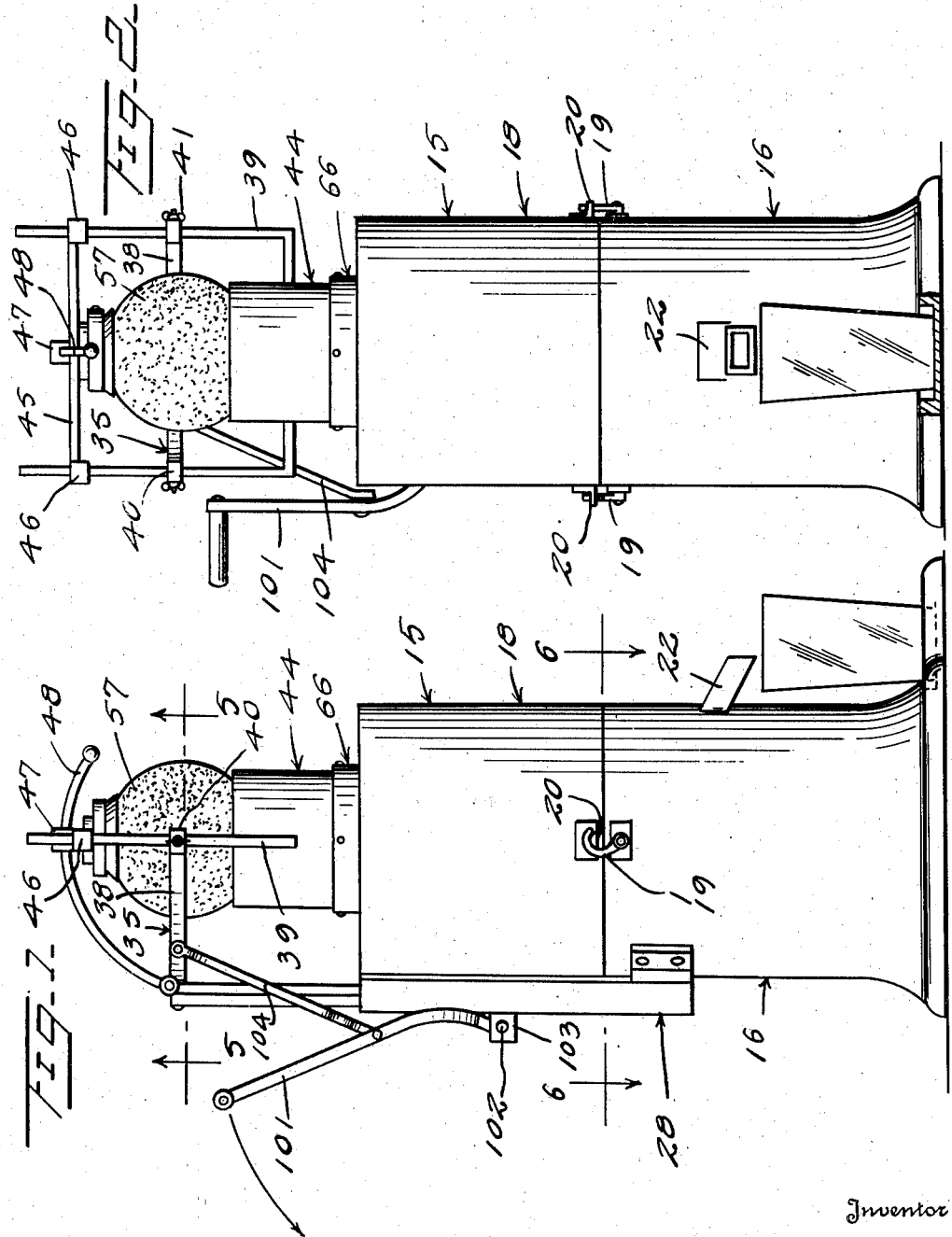

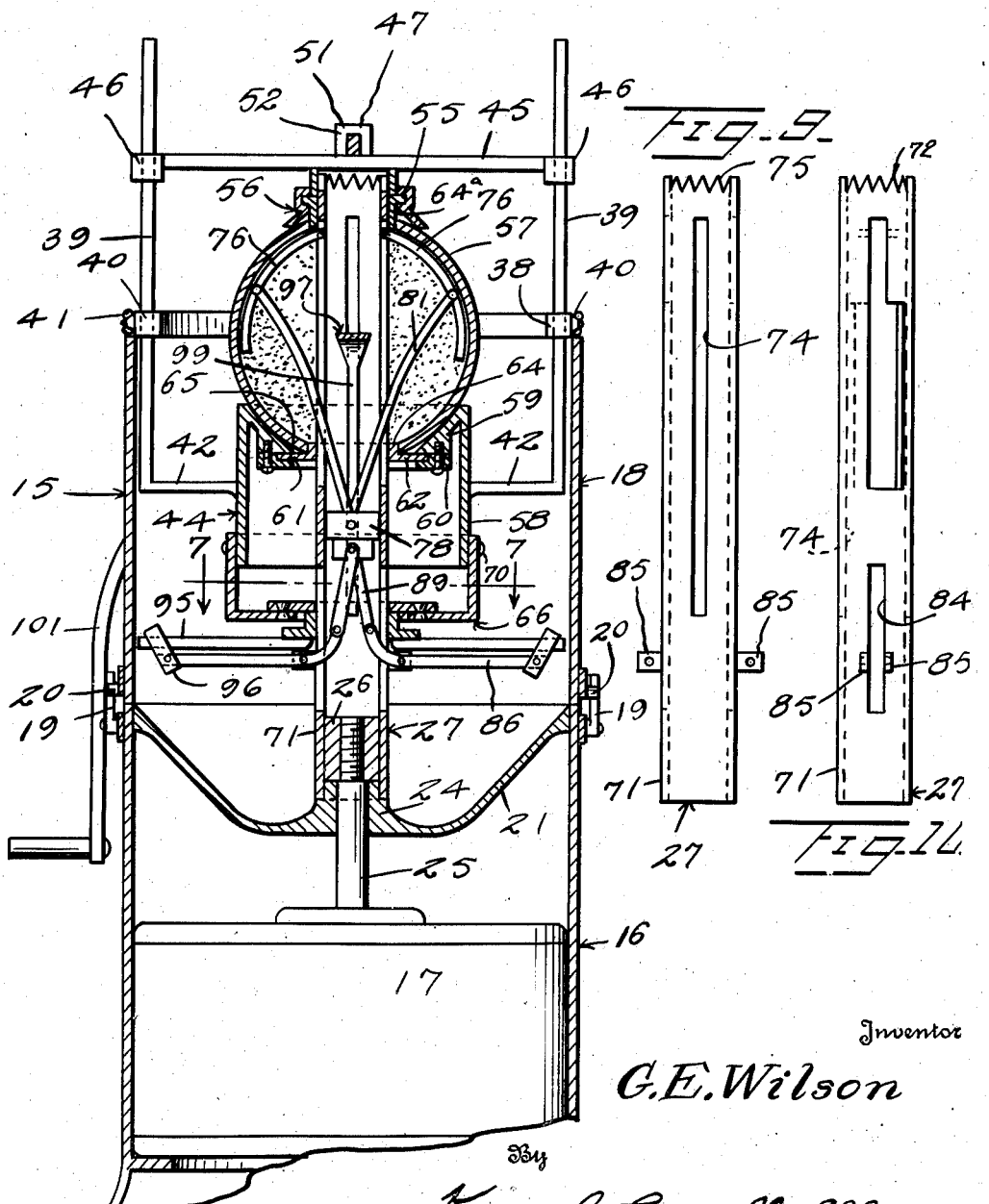

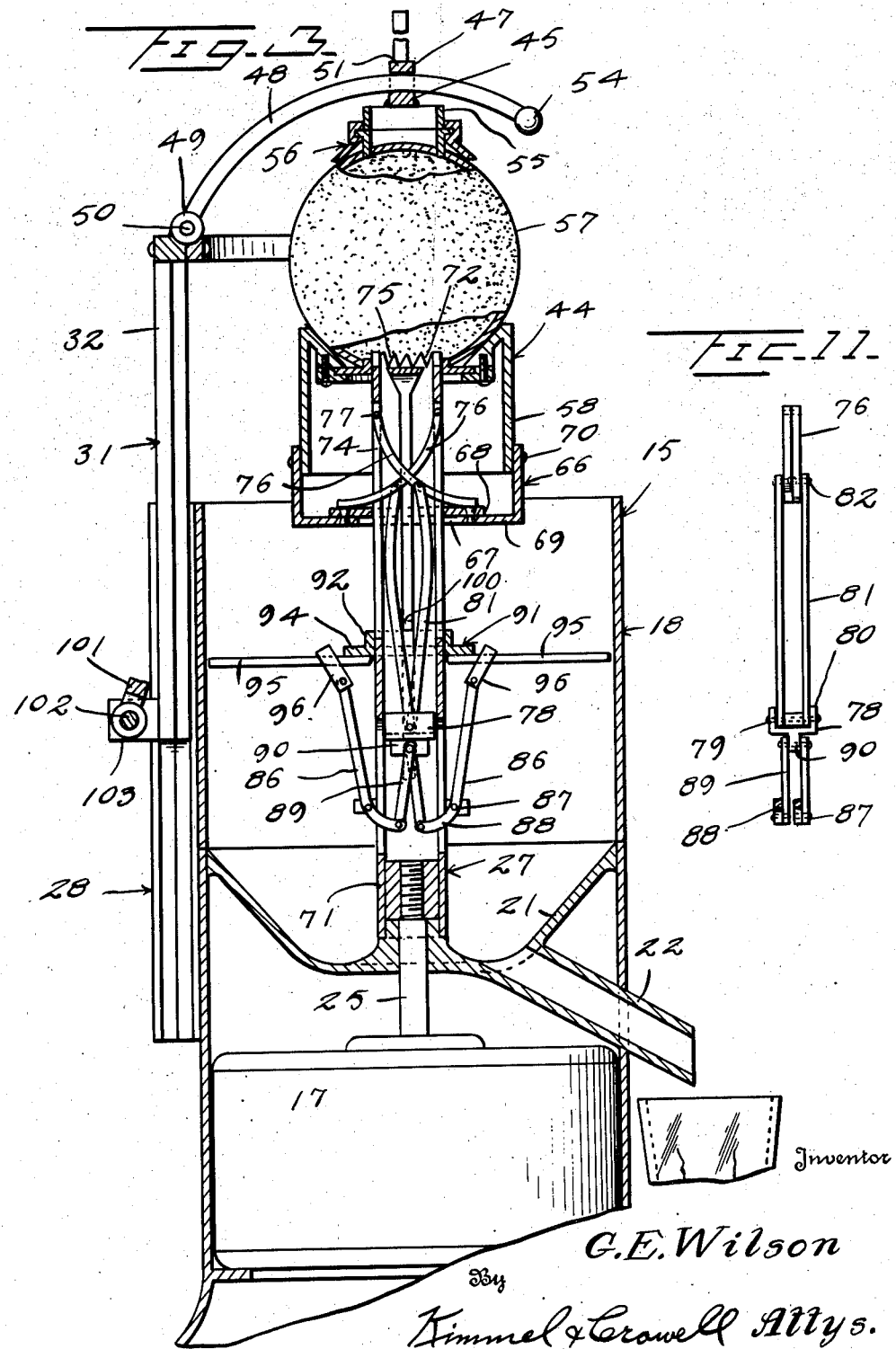

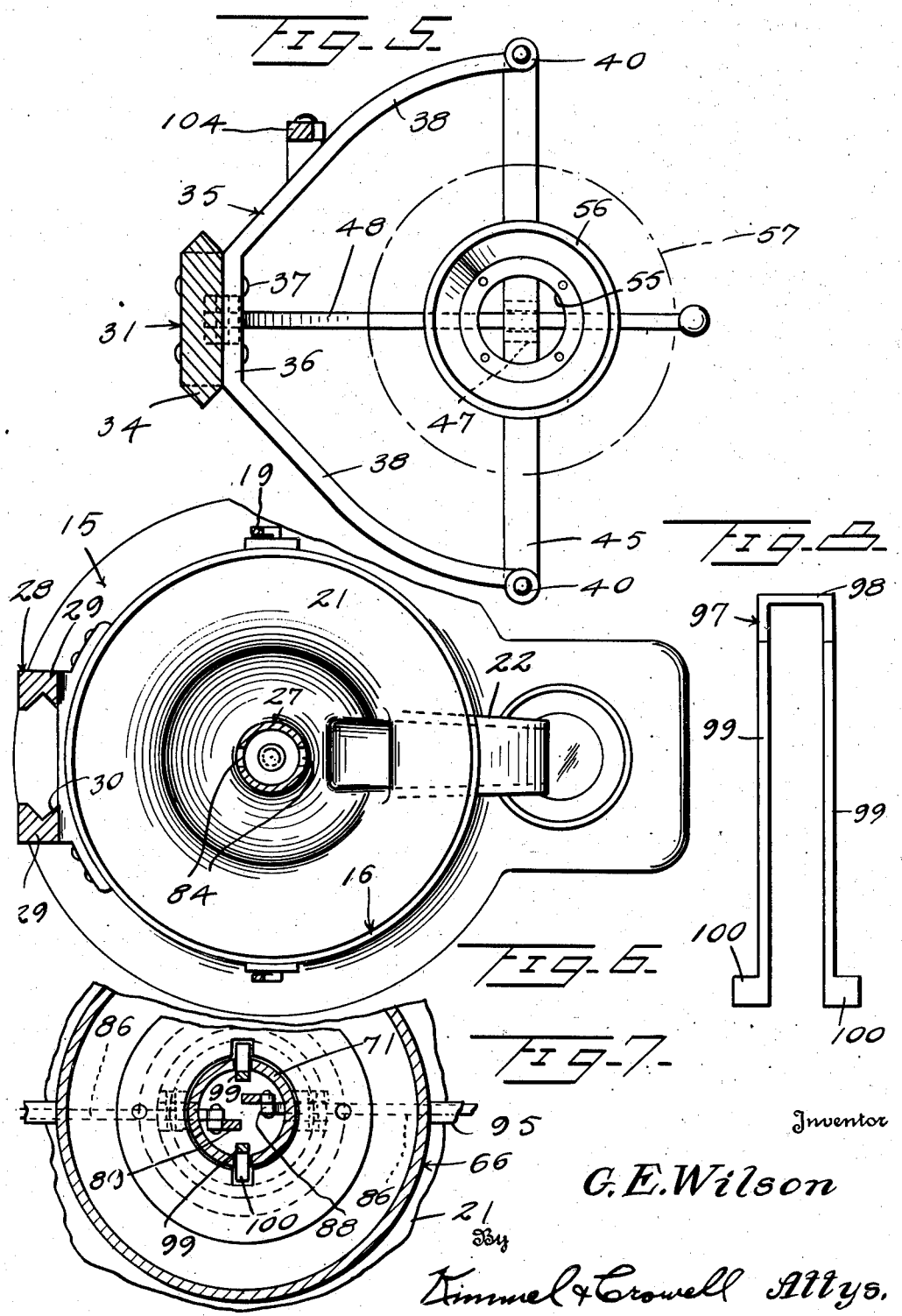

2,475,559

UNITED STATES PATENT OFFICE 2,475,559

FRUIT CORER AND JUICE EXTRACTOR

George E. Wilson, Fort Lauderdale, Fla.

Application November 24, 1947, Serial No. 787,691

5 Claims. (Cl. 146—3)

This invention relates to fruit corer and juice extractors.

It is an object of this invention to provide an improved fruit juice extractor of the kind to be more particularly described hereinafter, having electrically rotated cutting blades for cutting the fruit within the rind thereof, whereby the maximum amount of juice may be extracted from each orange, lemon or similar fruit.

Another object of this invention is to provide a fruit juice extractor of this kind which is particularly adapted for individual home use, the assembly being such that the extractor elements may be accessible for ready cleaning and repair.

With the above and other objects in view, my invention consists in the arrangement, combination and details of construction disclosed in the drawings and specification, and then more particularly pointed out in the appended claims.

In the drawings—

Figure 1 is a side elevation of a fruit juice extractor constructed according to an embodiment of this invention, Figure 2 is a front elevation, Figure 3 is a vertical section taken along the length of the extractor, Figure 4 is a transverse section with the rotating elements rotated to the same position as shown in Figure 3, Figure 5 is a horizontal section taken on the line 5—5 of Figure 1, Figure 6 is a horizontal section taken on the line 6—6 of Figure 1, Figure 7 is a fragmentary horizontal section taken on the line 7—7 of Figure 4, Figure 8 is a side elevation of the core element removed from the assembly, Figure 9 is a side elevation of the tubular corer member removed from the assembly, Figure 10 is a front elevation of the tubular corer member removed from the assembly.

Figure 11 is a side elevation of the cutting blades and actuating links removed from the assembly.

Referring to the drawings, the numeral 15 designates generally a fruit juice extractor having pivoted cutting blades contained therein for engagement within the body of an orange or other similar fruit for thoroughly removing the juice and pulp therefrom.

The fruit juice extractor 15 is formed of a tubular base 16 which contains an electric motor 17 to provide the power for the rotating elements. The base 16 is open at its upper end and an upper tubular extension of the base 18 is adapted to be secured thereto. The side walls of the upper sleeve 18 are adapted to abut the upper edge of the side walls of the base 16 in alignment therewith.

The base 16 is provided on opposite sides thereof with a hook 19 rockably supported thereon for engagement with a lug or keeper 20. The keeper 20 is fixed to or formed on the lower edge of the sleeve 18, whereby the sleeve 18 and the elements of the fruit juice extractor contained therein may be removed from the base 16 for cleaning or repair.

The base 16 is formed interiorly thereof with a cup-shaped reservoir or pan 21 having downwardly convergent side walls or tapered downwardly for collecting the juice from the fruit. The juice from the fruit is directed from the reservoir 21 downwardly and outwardly from the base 16 by a spout 22 extending through the walls of the base 16 and communicating with the bottom or apex of the reservoir 21.

A central boss 24 is formed in the reservoir 21 and the shaft 25 of the motor 17 extends upwardly through the boss 24 and is rotatable therein. The motor 17 may be disposed with its side surface overlying the lower portion of the base 16 so that the shaft 25 may be effectively the shaft of the rotor of the motor.

The upper edge of the reservoir 21 terminates at the same horizontal level as the upper edges of the side walls or edge of the lateral wall of the cylindrical hollow base 16. A tubular corer member to be more particularly described hereinafter is rotatably carried by the shaft 25 above the boss 24 of the reservoir 21. The upper end of the shaft 25 may be threaded as shown in Figures 3 and 4 for engagement with a nut 26 fixed to or otherwise carried by the lower end of the corer member 27.

A guide member as 28 is fixed to or otherwise carried by the side walls of the body of the fruit juice extractor, extending vertically thereof. The guide member 28 may be fixed to either the lower base 16 or preferably carried by the upper cylindrical body 18. The guide member 28 is formed with a pair of confronting channels 29 having inwardly opening V-shaped grooves 30 formed therein. The grooves 30 in the channel members 29 form rails for slidably supporting the sliding member 31.

The sliding member 31 is formed of an elongated bar 32 having triangular or tapered opposite outer edges 34. The edges 34 are adapted to slidingly engage in the confronting V-shaped or triangular grooves 30 of the channels 29, whereby the sliding member 31 may be moved vertically relative to the base 16 and tubular extension or sleeve 18.

A horizontal U-shaped supporting bracket 35 is fixed to or otherwise carried by the upper end of the sliding bar 32 of member 31. The bight 36 of the bracket 35 may be fixed to the bar 31 by rivets 37 or other suitable fastening devices. The outwardly extending arms 38 of the bracket 35 overlie the upper end of the tubular extension 18 and will be normally spaced thereabove.

A vertically extending rod or shaft 39 is carried by the outer free end of the arms 38. The outer ends of the arms 38 are provided with bearings as 40 within which the rods 39 are slidably engaged. A set screw as 41 is provided through bearings 40 on the arms 38 for engagement with the rods 39 contained within the bearings 40. A horizontal arm 42 is fixed to or formed integral with the lower ends of the rods 39 and extends inwardly relative to the body 18.

A fruit supporting carriage or tubular holder as 44 is supported on the inner end of the arms 42. A cross bar 45, having a bearing 46 at each end thereof is slidably supported on the rods 39. The bearings 46 of the cross rod 45 engage the rods 39 above the bearings 40 carried by the arms 38. A U-shaped bearing or sleeve member 47 is fixed to the upper side of the cross bar 45 midway the length thereof.

An operating lever 48 is rockably supported at one end on the upper end of the sliding member 31. A bearing 49 is carried by one end of the lever 48 and is engageable with the pintle 50 fixed to or carried by the member 31. The lever 48 is substantially arcuate along the length thereof convexed upwardly and is engageable between or through the U-shaped bearing or sleeve member 47 and the cross bar 45. The bight portion 51 of the bearing 47 engages over the upper edge of the lever 48 and the cross bar 45 engages the lower edge thereof while the arms 52 of the bearing 47 engage on opposite sides of the lever 48.

A handle 54 is fixed to the outer free end of the lever 48. An annular bearing, ring or boss 55 is fixed to the lower surface of the cross bar 45 below the bearing 47. A fruit clamping jaw 56 is carried by the bearing or boss 55 on the lower side thereof. The clamping member 56, together with the fruit supporting carriage 44 constitutes a clamping means for supporting an orange as 57 or other similar article of fruit on the fruit juice extractor 15.

Rocking movement of the lever 48 about its pivot 50 will effect the sliding movement of the cross bar 45 vertically on the supporting rods 39 for raising or lowering the clamping jaw 56 to the desired position relative to the carriage 44. In the lowered position of the lever 48 the clamping jaw 56 will engage the upper surface of the fruit 57 in the clamping position.

The fruit supporting carriage 44 is formed of a tubular body member 58, open at both ends thereof. The arms 42 which support the carriage 44 are connected at diametrically opposite points to the outer walls of the body 58 midway the vertical length thereof. An annular inturned flange or downwardly tapered rim 59 is formed on the upper end of the body 58 and the flange 59 is bent downwardly and convergently about or within the annular upper edge of the body 58. The downwardly inclined inturned flange 59 constitutes a seat or lower clamping jaw for supporting the article of fruit thereon.

An annular washer 60 is fixed to the lower edge of the flange 59 within the body 58. The washer 60 is formed with an annular rabbet 61 to provide an annular groove between the washer 60 and the lower edge of the flanges 59. An annular bearing member 62 is rotatably supported in the groove thus described. Bearing member 62 comprises a cylindrical sleeve 64, having a flange 65 which extends outwardly from the lower end thereof. The flange 65 rotatably engages in the groove formed between the washer 60 and the flanges 59. The upwardly extending sleeve 64 is adapted to be engaged within the opening formed in the lower end of the fruit 57 as will be described hereinafter. A similar flanged sleeve 64a is carried or swiveled at its top flange, in inverted, position relative to sleeve 64 between the bearing 55 and jaw 56 within which the upper end of the corer 27 is rotatably engaged in the lowered position of the carriage 44.

The carriage 44 is formed at the lower end thereof with a cup-shaped supporting member 66 which may be secured or mounted thereon. The bottom wall of the member 66 is formed with a central opening 67 therein, within which the corer member 27 is adapted to be slidably engaged. A central apertured reinforcing plate 68 is carried by the lower wall 69 of the member 66 about the opening 67. The plate 68 forms a bearing for the coring member 27 and also a bearing plate for the cutting blades hereafter described.

The carriage 44 is fixed to the carriage supporting member 66 by rivets 70 or other fastening means engaging through the side walls of the member 66 and the body 58. The corer member 27 is formed of an elongated tubular body 71 extending upwardly from the shaft 25 of the motor 17 and its lower end fits around the boss 24 and nut 26. The tubular corer member is of sufficient length to extend vertically through the sleeve 18 and upwardly beyond the upper edge thereof.

The core member or tube 71 extends upwardly through the fruit supporting carriage 44 by sliding engagement through the bearing plate 68 and the annular bearing member 62 at sleeve 64. In the raised position of the carriage 44 relative to the base of the extractor, the upper end of the tube 71 extends only slightly above the upper edge of the sleeve of the member 64.

A serrated or toothed cutting edge 72 is formed on the upper end of the corer member 27. The corer member 27 is formed adjacent its upper end with a pair of oppositely disposed elongated longitudinal slots 74 widened at the bottom to allow the fruit juice to run into the corer freely. The upper ends of the slots 74 terminate below the upper end of the body 71 and below the teeth 75. A pair of arcuate cutting blades 76 are rockably supported at the upper end of the slots 74 on the corer member 27. The cutting blades 76 are longitudinally arcuate in opposite directions and pivoted at one end by pins 77 extending across the slots 74 at the upper ends thereof.

In the normal position of the extractor, the blades 76 extend transversely across the diameter of the tube 71 in crossed relation and extend outwardly through the slot 74 on the opposite side thereof. In the normal position the lower end of the blade 76 overlies the upper surface of the bearing plate 68 on the opposite side of the tube 71 from the pivot 77 of each of the blades.

A sliding member 78 is supported within the corer member 27 for sliding movement therein. The sliding member 78 is substantially U-shaped in configuration and a pivot pin 79 extends transversely across and between the upwardly extending arms 80 thereof. A pair of links 81 are fixed between the sliding member 78 and the cutting blades 76. The lower end of the links 81 is rockably connected to the pin 79 and the upper end of the links 81 is pivotally connected to the blades 76 intermediate the length thereof by a pivot pin 82.

The links 81 are formed of a resilient length of metal or other suitable material which are slightly bowed outwardly in opposite directions along the length thereof. The links 81 are normally biased to the bowed position thereof, as shown in Figure 4 of the drawings. When the sliding member 78 is disposed in its lower position, as shown in Figure 3, the links are contained within the corer member 27 and are held therein against the tension urging them to their normal slightly bowed position. In this manner the blades 76 will normally move outwardly and radially of the tube 71 in the direction of the pivot point 77 thereof. Upon sliding movement of the member 78 upwardly in the tube 71, the lower end of each of the blades 76 will be rocked outwardly from the side of the tube on which the upper end of the blade is pivotally mounted, as shown in Figure 4 of the drawings.

A second pair of openings as 84 are formed in the lower end of the tube 71 on opposite sides thereof, and spaced beneath and in line with the openings 74. The openings 84 are elongated and a pair of ears 85 are formed or fixed on the tube 71 on opposite sides of the slot 84 adjacent the lower end. A pair of rock levers 86 are pivotally carried by a pin 87 engaging between the ears 85 and through the lever 86 intermediate its length. The lower or inner end 88 of the levers 86 is bowed inwardly and upwardly and extends through slots or openings 84 within the tube 71 in the normal position of the extractor.

Links as 89 are rockably supported at their upper end on the lower extension 90 fixed to or formed on the sliding member 78. The lower end of each of the links 89 is rockably connected to the lower inner end 88 of the levers 86.

A second sliding member or flanged collar 91 is carried loosely by the corer member 27. The sliding member 91 is formed with a sleeve body 92 having an annular outward flange 94 at the lower end thereof. A pair of radially extending bars or arms 95 are carried by the flange 94 radially of the housing 18. A collar as 96 is slidable along the length of each of the bars 95, and the upper ends of the levers 86 are rockably connected to the lower edge of the collar 96.

The carriage 44 in its downward sliding movement about the corer member 27 is adapted to engage the sliding member 91, and the further downward movement will effect the downward sliding movement of the member 91, together with the carriage 44, whereby the cutting members 76 will be rocked to their outward extended position within the fruit 57 through the linkage between the bars 95 and the cutting blades 76.

A central core or bore member 97 is also slidably contained within the tubular body 71. The core member 97 is formed with an upper flat head 98 and a pair of downwardly extending elongated arms 99 on opposite sides thereof. A lug 100 is fixed to or formed on the lower end of each of the arms 99 and are adapted to extend through a pair of longitudinal slots or openings 74' on opposite sides of the corer member 27 at right angles to slots or openings 74 and 84. The lugs 100 are adapted to abuttingly engage the upper edge of the sleeve 92 of member 91 which is adapted to move the core member 97 upwardly and the carriage 44 in its downward sliding movement will engage the plate 68 with the upper edges of the lugs 100 for moving the core member 97 downwardly. For sliding the carriage 44 on the corer member 27, a rock lever 101 is pivotally carried by the upper housing 18.

A pivot pin 102 is carried by a bracket 103 fixed on the guides 28. A connecting link 104 is pivotally connected at one end intermediate the length of the lever 101 and at its other end is pivotally connected to one of the arms 38 of the bracket 35 which forms a part of the fruit clamping member.

In the use and operation of the fruit juice extractor 15, an orange or other article of fruit 57 is initially placed between the carriage 44 and the upper clamping jaw 56. Raising of the lever 48 will provide sufficient space for inserting the fruit therein and downward movement of the lever will then engage the clamping jaw 56 about the upper surface thereof. As the extractor is biased to its normal position wherein the carriage 44 is disposed at the upper end of the corer 27 with lugs 100 of core member 97 resting on member 91 spaced below plate 68 to support and hold member 97 up as seen in Figure 3, the lever 101 will be normally biased to its raised position, as shown in Figure 1 of the drawings. With the carriage in its raised position, downward swinging movement of the lever 101 will effect the downward sliding movement of the carriage 44 about the corer member 27.

In this sliding movement the teeth 75 will initially cut into the core of the orange 57 with the collar engaged at the bottom or lower end thereof by member 97, and on further movement of the carriage 44 downwardly the lower wall 69 of the carriage support will engage the lower sliding member 91 and plate 68 lowered to member 91 and lugs 100. At this point the cutting blades 76 still remain in their initial position, as shown in Figure 3 of the drawings. Further sliding movement downwardly of the carriage 44 will effect the simultaneously sliding movement downwardly of the sliding member 91.

The collars 96 will then slide outwardly on the rods 95 for rocking the levers 86 about their pivots 87. As the levers 86 are thus rocked, the sliding member 78 will be moved upwardly in the tube 71. This upward movement of the sliding member 78 will raise the links 81 which, being connected to the cutting members 76, will effect the pivotal movement of the members 76 radially of the tube 71 within the orange 57, to a position as shown in Figure 4 of the drawings. During the sliding movement of the carriage 44, the motor 17 has been in operation rotating the corer member 27, and all of the levers and cutting members carried thereby.

The upper sleeve portion 64 of the member 62 provides a suitable bearing and protection for the lower edge of the fruit 57 as formed by the teeth 75 so that rotation of the corer 27 will not further break down or otherwise cut the edge of the orange. The juice thus being extracted is free to flow into the tubular corer 27 beneath the collar held up by member 97, through the openings 74, 74' and 84 and into the reservoir 21. Downward movement of the carriage 44 thus slides the corer member 97 downwardly to a position as shown in Figure 4 of the drawings to support the cut core thereon in the upper portion of the fruit so that the juice can flow out therebeneath. Upon complete removal of the juice and pulp from the orange, the lever 101 is raised, raising the carriage 44 and the fruit 57, where it may be removed. On this upward movement of the carriage the sliding member 91 will be moved upwardly and the corer member 97 will be moved to its raised position, as shown in Figure 3 of the drawings, by engagement of the lugs 100 with the upper edge of the sleeve 92.

I do not mean to confine myself to the exact details of construction herein disclosed, but claim all variations falling within the purview of the appended claims.

What I claim is:

1. A fruit juice extractor comprising a base, a motor on said base, a drive shaft rotatably connected to said motor, a rotatable tubular core member operatively connected to said drive shaft, a fruit supporting carriage about said core member slidable along the length thereof, a pair of arcuate cutter members pivotally connected to said core member near the upper end and rockable radially thereof, levers rockably mounted on said core member at the lower end thereof, links between said levers and said cutter members within said core member, a sliding member about said core member below said carriage, means rockably securing one end of said levers to said sliding member, means securing said latter means on said sliding member for sliding movement radially thereof, means clamping an article of fruit on said carriage, and means for sliding said carriage on said core member, said carriage engageable with said sliding member for unitary sliding movement together effecting rocking of said cutter members within said fruit.

2. A fruit juice extractor comprising a housing, a fruit supporting member, sliding means carried by said supporting member and said housing slidably supporting said fruit supporting member in said housing, a tubular corer member rotatable in said housing and slidable through said supporting member for penetrating an article of fruit carried thereby, rockable cutting blades on the upper end of said corer member, a sliding member in said tubular member, links connected between said sliding member and said cutting blades, levers rockably mounted on said corer member, links connecting one end of said levers to said sliding member, a sliding member about said corer member, a sliding connector member between the other end of said levers and said latter sliding member, said supporting member engageable with said latter sliding member in the lowered positions thereof for effecting rocking of said cutting members within said article of fruit upon sliding of said supporting member, and means for rotating said corer member.

3. A fruit juice extractor comprising a housing, a fruit supporting member, sliding means carried by said supporting member and said housing slidably supporting said fruit supporting member in said housing, a tubular corer member rotatable in said housing and slidable through said supporting member for penetrating an article of fruit carried thereby, rockable cutting blades on the upper end of said corer member, a sliding member in said tubular member, links connected between said sliding member and said cutting blades, levers rockably mounted on said corer member, links connecting one end of said levers to said sliding member, a sliding member about said corer member, a sliding connector member between the other end of said levers and said latter sliding member, said supporting member engageable with said latter sliding member in the lowered positions thereof for effecting rocking of said cutting members within said article of fruit upon sliding of said supporting member, a bearing member about said corer member rotatably carried by said supporting member in engagement with the article of fruit supported, and means for rotating said corer member.

4. A fruit juice extractor comprising a housing, a fruit supporting member, clamping means carried by said supporting member securing an article of fruit therein, sliding means carried by said supporting member and said housing slidably supporting said fruit supporting member in said housing, a tubular corer member rotatable in said housing and slidable through said supporting member for penetrating an article of fruit carried thereby, rockable cutting blades on the upper end of said corer member, a sliding member in said tubular member, links connected between said sliding member and said cutting blades, levers rockably mounted on said corer member, links connecting one end of said levers to said sliding member, a sliding member about said corer member, a sliding connector member between the other end of said levers and said latter sliding member, said supporting member engageable with said latter sliding member in the lowered positions thereof for effecting rocking of said cutting members within said article of fruit upon sliding of said supporting member, and means for rotating said corer member.

5. A fruit corer and juice extractor comprising a housing, a fruit supporting member, sliding means carried by said housing slidably supporting said fruit supporting member, a tubular core member rotatable in said housing and held against axial movement, said core member adapted to penetrate an article of fruit carried by the supporting member upon downward movement of the latter and fruit carried thereby, cutting blades carried in the upper portion of the core member and movable outwardly thereof into the fruit, a slidable member carried by the core member below and spaced from the supporting member, operative connections between the sliding member and the cutting blades for actuating the cutting blades upon downward movement of the supporting member to engage and slide said sliding member on the core member and means within the core member and supported by the slidable members to move upwardly in the core member and supporting member above the latter and into the fruit to support and hold the core cut thereby upwardly upon downward movement of the supporting member.

GEORGE E. WILSON.

REFERENCES CITED

The following references are of record in the file of this patent:

UNITED STATES PATENTS

| Number | Name | Date |
| --- | --- | --- |
| 883,786 | Chatain | Apr. 7, 1908 |
| 1,002,242 | Ehrhardt | Sept. 5, 1911 |
| 1,070,854 | Stoler et al. | Aug. 19, 1913 |
| 1,445,998 | Coons | Feb. 20, 1923 |
| 1,825,628 | Floyd et al. | Sept. 29, 1931 |
| 1,925,196 | Maull | Sept. 5, 1933 |
| 1,957,883 | Grayson | May 8, 1934 |
| 1,994,114 | Somers | Mar. 12, 1935 |
| 2,243,025 | Wilson | May 20, 1941 |

FOREIGN PATENTS

| Number | Country | Date |
| --- | --- | --- |
| 551,277 | Germany | May 28, 1932 |
| 606,813 | Germany | Dec. 11, 1934 |